(12) United States Patent
Call et al.

(10) Patent No.: US 9,266,516 B2
(45) Date of Patent: Feb. 23, 2016

(54) BRAKE CYLINDER MAINTAINING VALVE

(71) Applicant: New York Air Brake Corporation, Watertown, NY (US)

(72) Inventors: Derick Call, Evans Mill, NY (US); Jason Connell, Bethel Park, PA (US); Steven R. Newton, Adams, NY (US)

(73) Assignee: New York Air Brake, LLC, Watertown, NY (US)

( * ) Notice: Subject to any disclaimer, the term of this patent is extended or adjusted under 35 U.S.C. 154(b) by 180 days.

(21) Appl. No.: 14/039,037

(22) Filed: Sep. 27, 2013

(65) Prior Publication Data

US 2014/0102558 A1    Apr. 17, 2014

Related U.S. Application Data

(63) Continuation of application No. 13/652,896, filed on Oct. 16, 2012, now Pat. No. 9,108,603.

(51) Int. Cl.
| | |
|---|---|
| *B60T 15/00* | (2006.01) |
| *B60T 17/04* | (2006.01) |
| *B60T 17/22* | (2006.01) |
| *B60T 15/30* | (2006.01) |

(52) U.S. Cl.
CPC ............ *B60T 17/04* (2013.01); *B60T 17/228* (2013.01); *B60T 15/302* (2013.01); *Y10T 137/7793* (2015.04)

(58) Field of Classification Search
CPC ..... B60T 17/04; B60T 15/302; B60T 17/228; B60T 13/665; B60T 13/406; B60T 8/1893; Y10T 137/7793
USPC ............ 303/57, 3, 7, 15, 22.6, 22.7, 127, 128
See application file for complete search history.

(56) References Cited

U.S. PATENT DOCUMENTS

| | | | |
|---|---|---|---|
| 2,796,300 A | 6/1957 | Cotter | |
| 2,812,986 A | 11/1957 | Jeffrey et al. | |
| 2,861,843 A | 11/1958 | Bentz et al. | |
| 4,125,292 A | 11/1978 | Worbois et al. | |
| 4,478,460 A * | 10/1984 | Wickham | 303/68 |
| 5,071,198 A * | 12/1991 | Troiani | 303/37 |
| 5,083,843 A * | 1/1992 | Engle | 303/74 |
| 7,520,574 B2 * | 4/2009 | Schweikert et al. | 303/128 |

FOREIGN PATENT DOCUMENTS

AU     2009202435     1/2010

OTHER PUBLICATIONS

International Search Report Form PCT/ISA/220, International Application No. PCT/US2013/065247, pp. 1-8, Dated Mar. 6, 2014.

* cited by examiner

*Primary Examiner* — Pamela Rodriguez
(74) *Attorney, Agent, or Firm* — David L. Nocilly; Bond Schoeneck & King, PLLC

(57) ABSTRACT

A brake cylinder maintaining valve may include spool valves or poppet valves. When the pressure in the brake cylinder drops below its original set pressure, such a maintaining valve may feed brake pipe (BP) pressure through a choke to replenish and maintain brake cylinder (BC) pressure up to a certain point. If the leak is too great, such as when it exceeds the capacity of the choke, the brake cylinder pressure will not be maintained. Such a maintaining valve may be either integrated into the control valve, or it may be mounted remotely to the brake system. If mounted remotely, it may be connected by multiple ways, including through a conventional 4-port access plate.

9 Claims, 11 Drawing Sheets

BRAKE CYLINDER MAINTAINING VALVE

CROSS REFERENCE TO RELATED APPLICATIONS

This application is a continuation-in-part of and claims the priority benefit of copending U.S. patent application Ser. No. 13/652,896, filed on Oct. 16, 2012, the entire contents of which are incorporated herein by reference.

BACKGROUND AND SUMMARY

The present disclosure relates generally to control valves for use in freight car brake equipment, and more particularly to a valve that maintains the brake cylinder pressure in such control valves.

Control valves used in freight car brake equipment (e.g., the DB-60 control valve manufactured by New York Air Brake Corporation, Watertown, N.Y. USA or the ABDX control valve manufactured by Wabtec Corporation, Wilmerding, Pa. USA) are well known. If such control valves supply air pressure to the brake cylinder of a freight car, and the plumbing between the control valve and the freight car has a leak, then the brake cylinder will not maintain the original set pressure. This could be due to, for example, a leaking packing cup in the brake cylinder, a leaking hose, or any other reason that would lead to the leaking of pressure between the connection of the control valve and the brake cylinder.

One means of avoiding such problems may be to have a valve that maintains the brake cylinder pressure. When the pressure in the brake cylinder drops below its original set pressure, such a maintaining valve may feed brake pipe (BP) pressure through a choke to replenish and maintain brake cylinder (BC) pressure up to a certain point. If the leak is too great (i.e., to the extent it exceeds the capacity of the choke), the brake cylinder will not be maintained. Such a maintaining valve may be either integrated into the control valve, or it may be mounted remotely to the brake system. If mounted remotely, it may be connected by multiple ways, including through a conventional 4-port access plate.

Other objects, advantages and novel features of the present invention will become apparent from the following detailed description of the invention when considered in conjunction with the accompanying drawings.

DETAILED DESCRIPTION OF THE INVENTION

Exemplary embodiments are discussed in detail below. While specific exemplary embodiments are discussed, it should be understood that this is done for illustration purposes only. In describing and illustrating the exemplary embodiments, specific terminology is employed for the sake of clarity. However, the embodiments are not intended to be limited to the specific terminology so selected. Persons of ordinary skill in the relevant art will recognize that other components and configurations may be used without departing from the true spirit and scope of the embodiments. It is to be understood that each specific element includes all technical equivalents that operate in a similar manner to accomplish a similar purpose. The examples and embodiments described herein are non-limiting examples.

Figure 1:
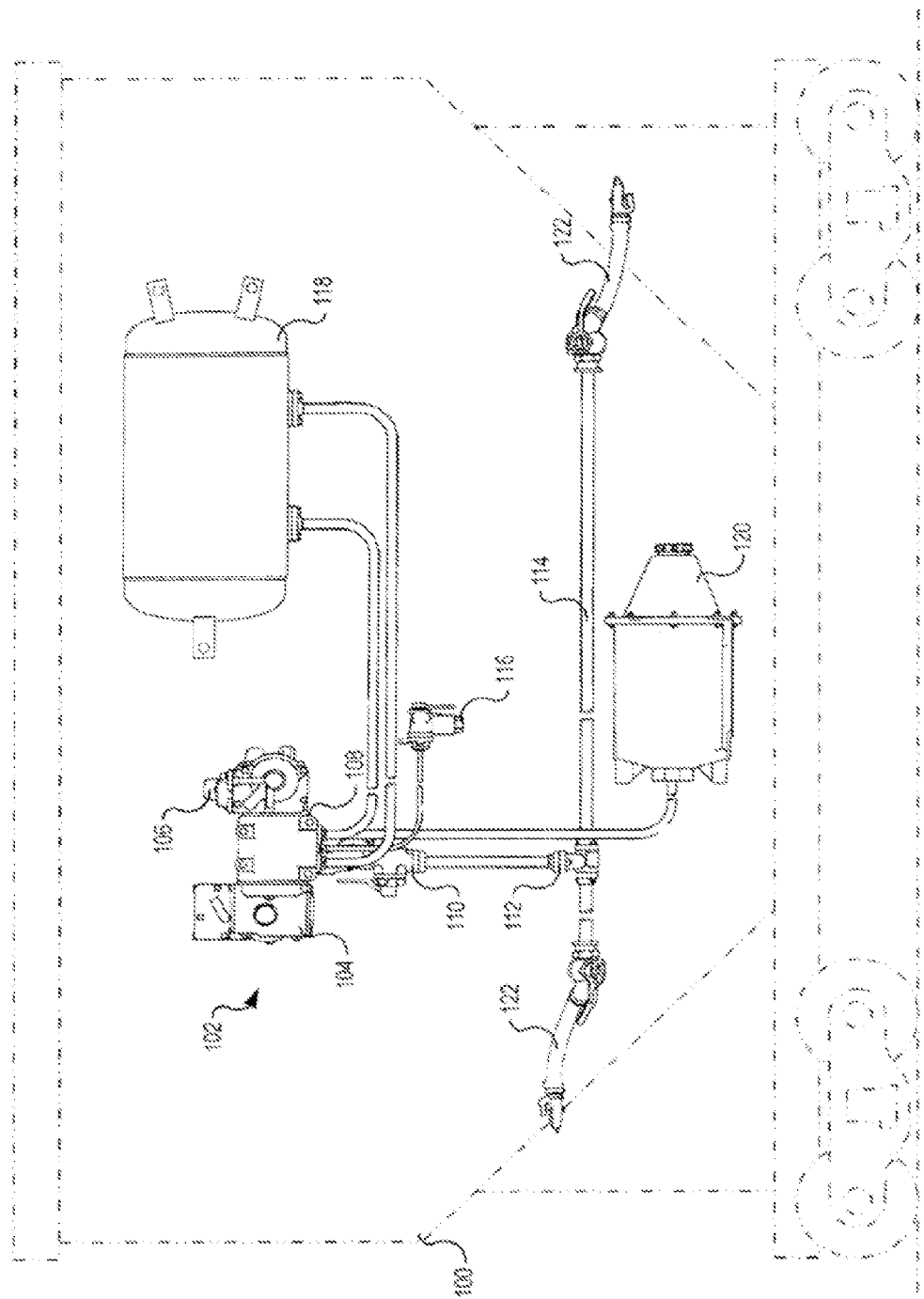
FIG. 1 is a schematic of freight car brake equipment according to the prior art.

Referring now to the drawings, wherein like reference numerals and characters represent like or corresponding parts and steps throughout each of the views, there is shown in FIG. 1 a schematic representation of a brake system associated with a prior art freight or rail car 100. The system may be used to operate air brakes (not shown) in accordance with known embodiments of the prior art. As illustrated, the freight car brake equipment includes a brake control valve 102 having a service portion 104 and an emergency portion 106 connected to a pipe bracket 108. A cut-off cock 110 connects, through a branch pipe tee 112, brake pipe 114 to the pipe bracket 108 at port BP. A retaining valve 116 connected to exhaust is connected to pipe bracket 108 at retainer port RET. A combined reservoir 118, having an auxiliary AUX RES and an emergency reservoir EMER RES is connected to respective ports AR and ER of pipe bracket 108. A brake cylinder 120 may be connected through an empty/load device (not shown) to brake cylinder port BC. The elements described so far are part of normal freight car brake equipment. The service portion 104, emergency portion 106, and pipe bracket 108 are standard parts, for example, a DB-60 from New York Air Brake Corporation or Knorr Bremse AG. Similarly, they may be an ABDX or other AAR approved brake valves.

Air used to operate the brakes on rail cars may be transmitted through brake pipe 114 to brake control valve 102, and may accumulate in combined reservoir 118. Brake pipe 114 may be coupled with corresponding brake pipes in attached rail cars (not shown) through AAR standard air brake hoses 122 to form a train line operable to communicate air from an associated locomotive (not shown) to each rail car 100 attached to the locomotive as part of a train. Brake pipe 114 may serve at least two purposes. First, air may travel through brake pipe 114 to accumulate in combined reservoir 118 for each individual rail car 100. Second, brake pipe 114 may facilitate transmission of a pressure drop that activates respective brakes associated with each rail car 100.

Figure 5:
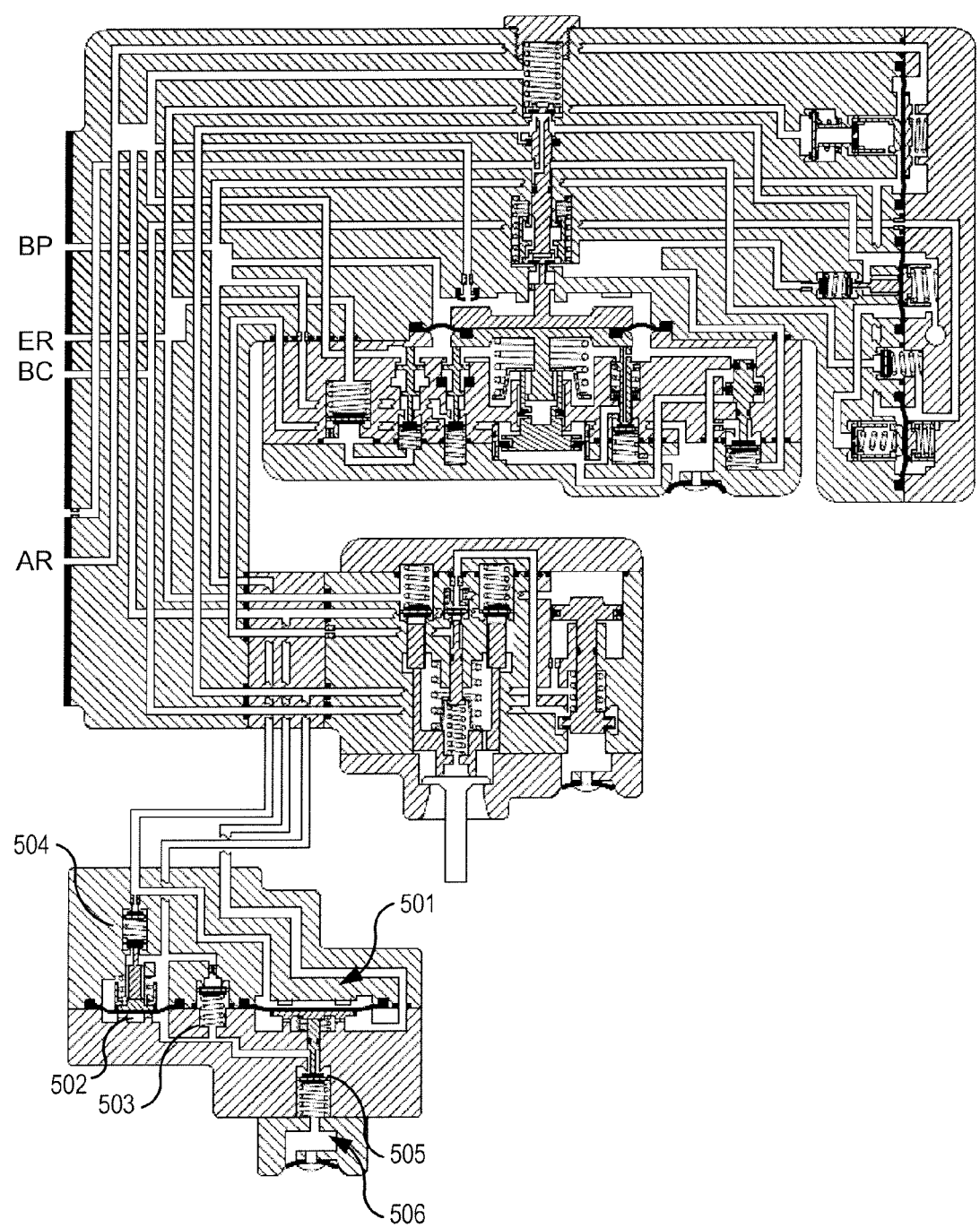
FIG. 5 is a diagrammatic view of a brake cylinder maintaining valve in its charging lap position utilizing a sandwich plate between the service portion of the brake control valve and its release valve.
Figure 6:
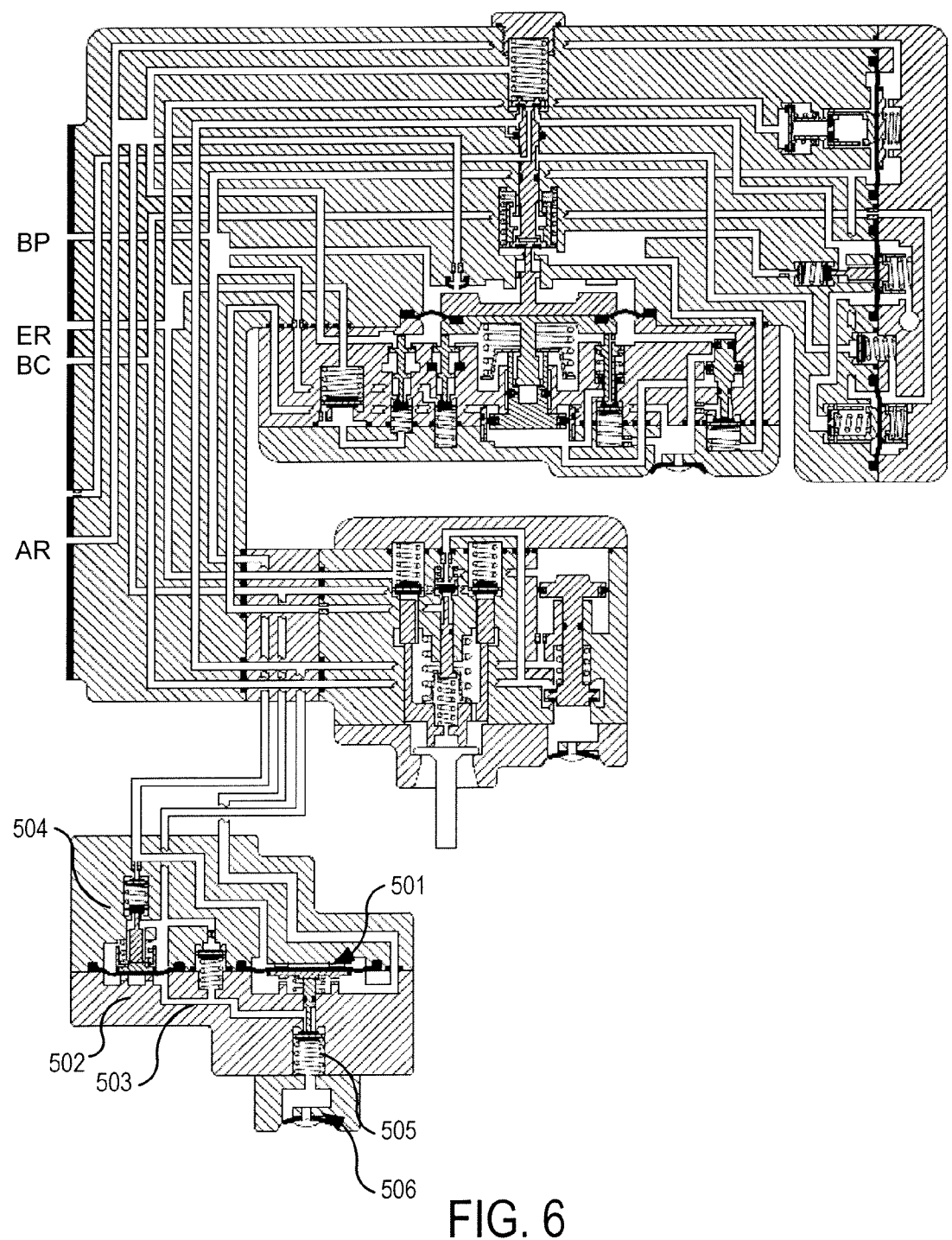
FIG. 6 is a diagrammatic view of a brake cylinder maintaining valve in its service lap position utilizing a sandwich plate between the service portion of the brake control valve and its release valve.
Figure 7:
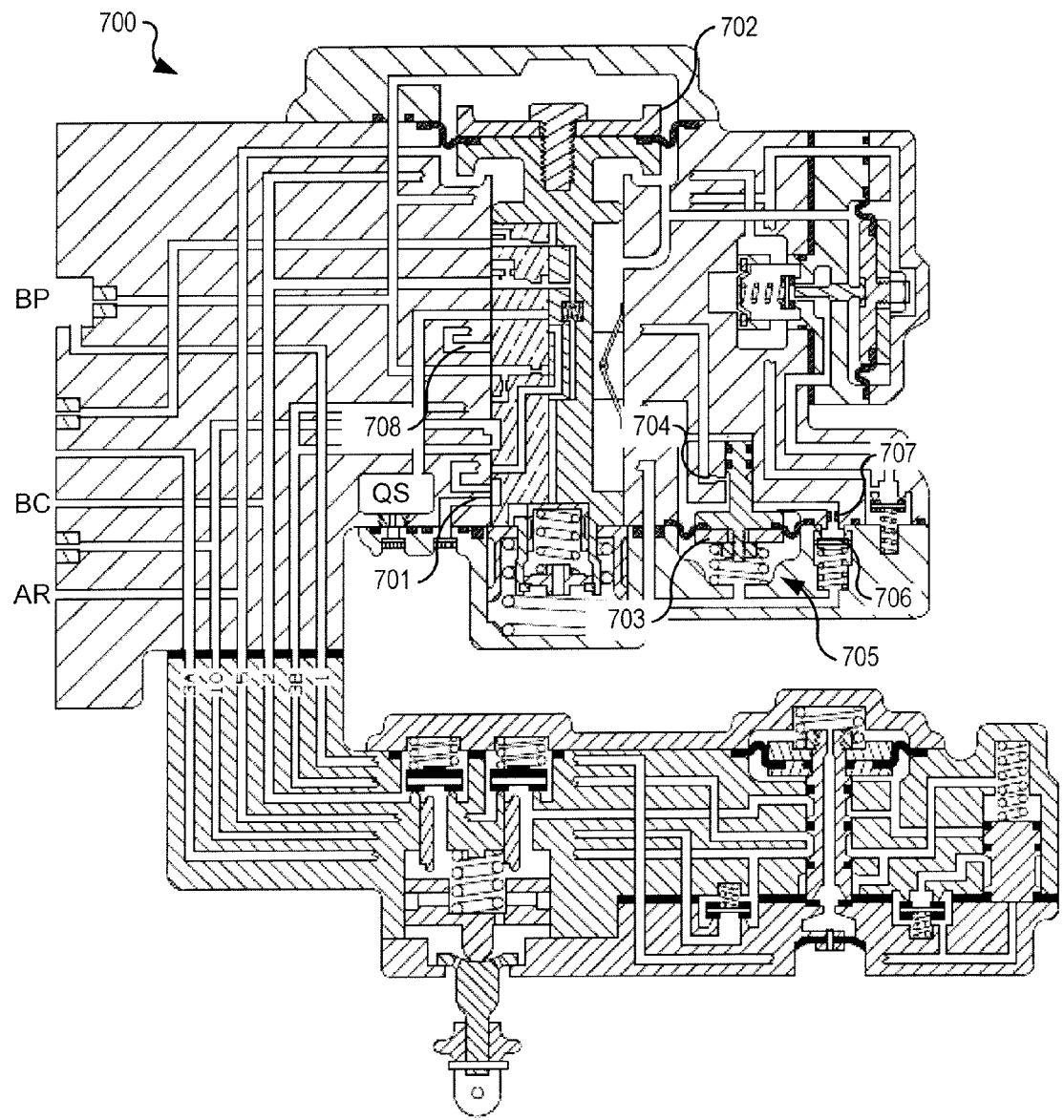
FIG. 7 is a diagrammatic view of an ABDX-type brake cylinder maintaining valve in its charging lap position.
Figure 8:
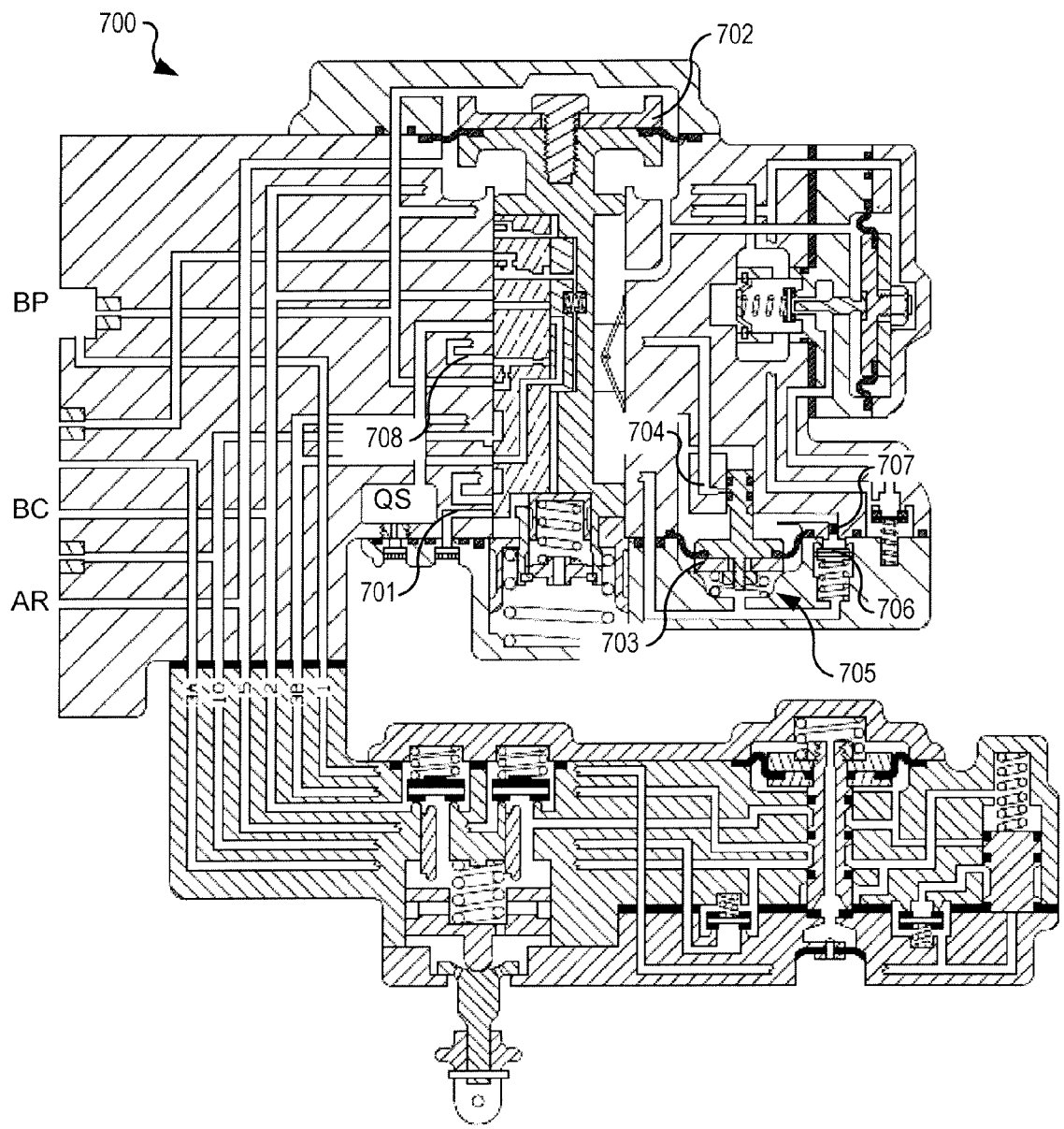
FIG. 8 is a diagrammatic view of an ABDX-type brake cylinder maintaining valve in its service lap position.

Although the improvement herein will be shown in FIGS. 3-10 to have been incorporated into the service portion of the DB-60, the present improvement may be provided to any brake control valve portion which includes a piston responsive to brake pipe pressure on one side and a reservoir as the source of brake cylinder pressure on the other side of the diaphragm. Thus, the invention may be used in other AAR-styled brake control valves or non-AAR brake control valves, including ABDX-type control valves as shown in FIGS. 7-8. Only those portions of the service portion of the DB-60 and ADBX which explain the operation of the present invention have been included in the schematics and others have been intentionally deleted for sake of clarity.

Pipe bracket 108 supports and aligns both service 104 and emergency 106 portions and supplies air to the valvular components. The precontrolled flow of air to and from the brake pipe 114, brake cylinder 120, combined auxiliary/emergency reservoir 118 and retaining valve 116 is also directed through the pipe bracket 108 to which all connections are made, with butt or socket welded flange fittings.

The specific functions of the service portion 104 are to supply air to the combined reservoir 116 during initial charging of the system and recharging following release of an application; to direct auxiliary reservoir AR air into the brake cylinder 118 depending on a predetermined rate and amount of brake pipe pressure reduction; to exhaust brake cylinder BC air during release after an application; to guarantee stability of the brake system in release condition against undesired application of the brakes which may result from permissible brake system leakage; and to guarantee stability of the brake system in service lap condition against undesired release of the brakes which may result from permissible auxiliary reservoir leakage. The service portion 104 also functions to support recharge of the brake system during the release of a service application by feeding emergency reservoir ER air into the brake pipe 112 independent from the main piston system; to guarantee minimum reduction during initial brake pipe reduction and maintain minimum brake cylinder BC pressure by connecting quick service chamber QS-Ch. and brake cylinder BC pressures; to support initial brake pipe reduction by venting brake pipe BP air to the atmosphere ATM during the preliminary quick service stage; to support recharge of the brake system after manual release subsequent to an emergency application by connecting the pressure of the auxiliary reservoir to the brake pipe 112, to permit exhaust of retainer held brake cylinder pressure in the retainer pipe and volumes during manual release subsequent to a service reduction; to directly release brake cylinder pressure independent of the main piston system after any application by manual activation of the release handle; to provide manual drain means for auxiliary reservoir and emergency reservoir pressures; and to release the main piston system after a service application by manual activation of release handle.

In order to perform these functions, the service portion 104 is equipped with the following subcomponents.

Figure 2:
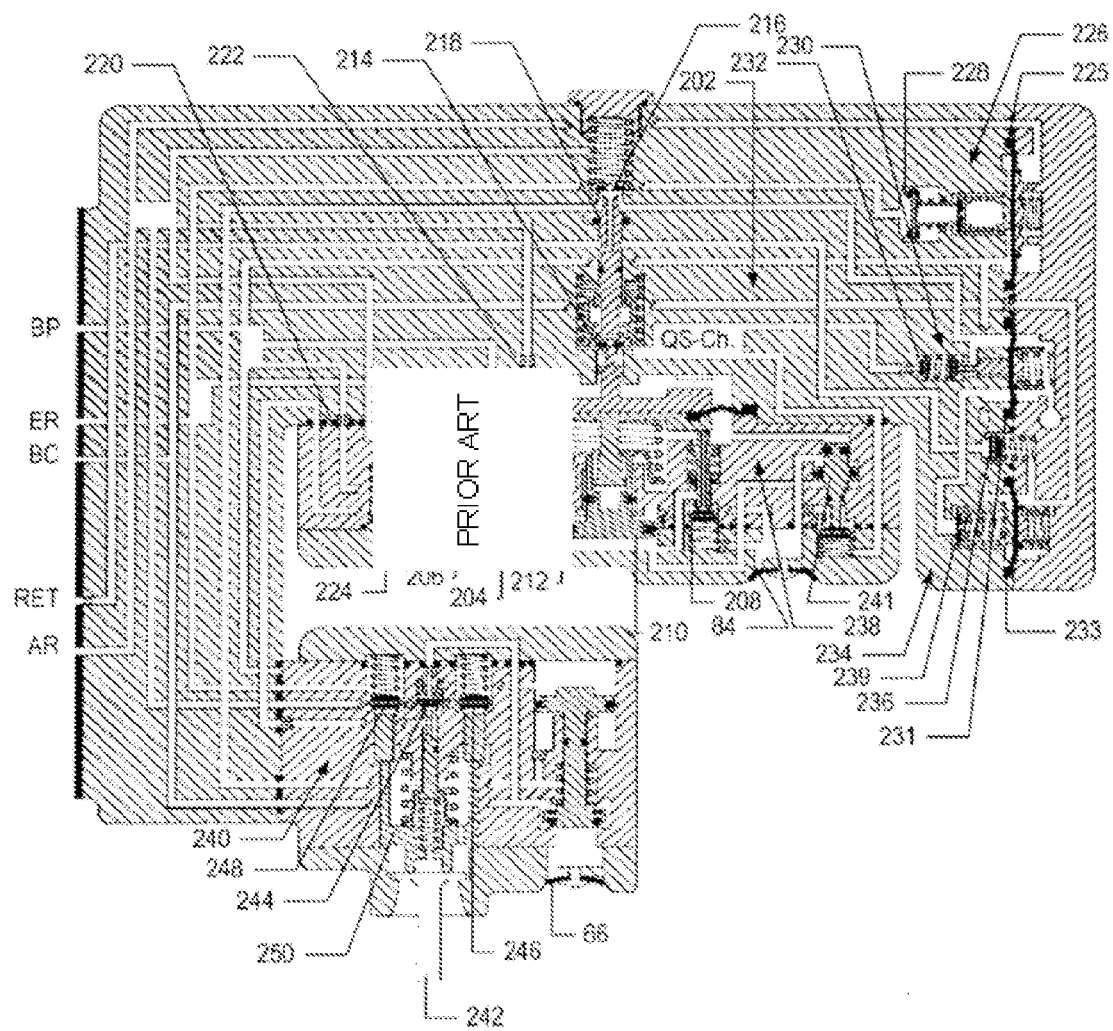
FIG. 2 is a diagrammatic view of a service portion of a brake control valve used in the freight car brake equipment shown in FIG. 1.

As shown in FIG. 2, the service main piston 202 compares brake pipe BP and auxiliary reservoir AR pressures acting on equal areas. Auxiliary reservoir charging 204, emergency reservoir charging 206, and balancing valves 208 are spaced uniformly at 120° intervals around the same diameter and are mechanically operated by the bottom side of the piston. The coaxially arranged balancing piston 210 is pressurized with auxiliary reservoir AR air by the balancing valve 208 and acts on the balancing spring 212 which stabilizes the main piston system 202 in service lap position.

The main piston 202 operates the quick service inlet valve 214, which allows brake pipe BP air to flow to the quick service chamber (QS-Ch.). The auxiliary reservoir/brake cylinder inlet 216 and brake cylinder/retainer outlet valves 218 are also mechanically operated by the main piston 202. Stability of the main piston system 202 in the release position is provided by means of the sensitivity 220 and stability chokes 222; stability in the service lap positions is provided by means of the stability choke 222. A separate emergency reservoir charging check valve/choke 224 arrangement prevents uncontrolled return flow of emergency reservoir ER air into the auxiliary reservoir when releasing the brakes from a service application. Thus, no undesired reapplication of the brakes will occur during release.

A metal reinforced rubber diaphragm 225 of the service accelerated release valve 226 also compares brake pipe BP and auxiliary reservoir AR pressures acting on equal areas; this component operates independently of the service main piston system 202. When the service accelerated release valve 226 is triggered, emergency reservoir ER air passes by the high sensitivity back flow check valve 228 into the brake pipe BP.

A metal reinforced rubber diaphragm 231 of the quick service limiting valve 230 is pressurized by brake cylinder BC air and allows restricted flow of brake pipe/quick service air to the brake cylinder 118 to a predetermined value. The quick service limiting check valve 232 prevents return flow of brake cylinder BC air to atmosphere ATM during emergency applications and in the event of a retainer is being set in "high pressure retaining" position with the service main piston system 202 in the release position.

A metal reinforced rubber diaphragm 233 of the emergency release auxiliary reservoir reduction valve 234 is pressurized by brake pipe and brake cylinder air in opposite sides. After manual release of brake cylinder pressure subsequent to an emergency application, increasing brake pipe pressure during recharging operates the valve and allows auxiliary reservoir air to flow via the emergency release auxiliary reservoir reduction check valve 234 into the brake pipe and assists during brake pipe recharging. The retaining check valve 236, by means of a choke, allows reduction of retainer held brake cylinder air to a pressure level which allows the brake cylinder piston to move to release position.

The quick service valve 238 piston is pressurized by auxiliary reservoir AR air on one side and controls the flow of quick service QS air to atmosphere ATM. As soon as the service main piston system 202 allows the balancing valve 208 to pressurize the larger opposite area of the quick service valve piston with auxiliary reservoir air, the venting of quick service/brake pipe air will be interrupted. The piston of release valve 240 is pressurized on both sides with brake cylinder BC air and seals the connection from brake cylinder 120 to atmosphere ATM.

Upon activation of the release valve handle 242, the upper side of the piston is vented through the release exhaust valve 244 which allows the piston to open the passage from brake cylinder 120 to atmosphere ATM. The piston remains in this position until brake cylinder lockup pressure below the piston is released by the service main piston system 202 upon its release. Auxiliary reservoir exhaust 246 and emergency reservoir exhaust 248 valves are mechanically operated by the release valve lifter 250 and allow high capacity flow of auxiliary reservoir/emergency reservoir air to the atmosphere in order to drain the brake system.

Charging Lap Position

Compressed air from the brake pipe 114 flows into the pipe bracket 108 via the combined dirt collector and cut-out cock.

One flow path leads through the pipe bracket strainer into the service 104 and emergency 106 portions to supply those with filtered air. The other flow path bypasses the pipe bracket strainer and leads to the vent valve (not shown) in the emergency portion 106 to allow unrestricted venting of brake pipe BP air during an emergency application. During charging, brake pipe air pressurizes the following valve components:

Brake pipe BP air pressurizes the main piston, the valve seat area 214, and flows to the service accelerated release valve 226 and the emergency release auxiliary reservoir reduction valve 234. The auxiliary reservoir is charged directly by the service main piston system 202. From the brake pipe 118, the air flows via choke 220 and an open valve seat 204 to the volume below the main piston, pressurizing the upper side of balancing piston 210. Auxiliary reservoir air further flows to the AR/BC inlet valve 216, to the release valve 240, to the valve seat in the balancing valve 208, to the quick service valve 238 and the auxiliary reservoir via the pipe bracket 108. Additional auxiliary reservoir charging is accomplished by air flow via stability choke 222.

If, during charging, the pressure differential created by chokes 220 and 222 across the main piston exceeds a predetermined value, the main piston moves into retarded recharge position and returns to charging lap position when brake pipe BP and auxiliary reservoir AR pressures approach equalization.

The emergency reservoir is charged from auxiliary reservoir air via open valve seat 206. The auxiliary reservoir AR air in the volume below the main piston 202 flows via an open valve seat in the emergency reservoir charging check valve 224 to the service accelerated release valve 226, to the release valve 240, to the emergency portion (not shown) and via the pipe bracket 118 into the emergency reservoir.

The left side of diaphragm 225 is pressurized with brake pipe BP air, the right side with auxiliary reservoir AR air. Emergency reservoir ER air flows to the closed valve seat via back flow check valve 228. The left side of diaphragm 233 is pressurized with brake pipe BP air. The diaphragm 233 is thereby forced on its right-hand stop against the force of a spring. Simultaneously, the emergency release auxiliary reservoir reduction check valve 239 is forced on its valve seat by the combined forces of a spring and brake pipe BP pressure.

Auxiliary reservoir AR air in the volume below the main piston also pressurizes the upper area of piston 241. The piston 241 is thereby forced downward and opens the valve seat against the force of the spring. Auxiliary reservoir AR air pressurizes auxiliary reservoir exhaust valve 246. Emergency reservoir ER air pressurizes emergency reservoir exhaust valve 248.

Service Lap Position

During a service brake application, the brake cylinder is charged from the auxiliary reservoir by the service main piston system 202. As soon as the auxiliary reservoir pressure is reduced to approximately the value of the brake pipe pressure, the service main piston system 202 moves from the service position to the service lap position. Herewith, valve seat 216 is closed and the flow path between auxiliary reservoir and brake cylinder is interrupted. The balancing piston 210 acts on the balancing spring 212 through its spring guide. This introduces a defined force in the service main piston system 202, which holds it in the service lap position.

Brake pipe BP and auxiliary reservoir AR are connected through the very small stability choke 222 which determines the release stability. During a further brake pipe reduction, the service main piston system 202 will again move the service position, and the flow path from auxiliary reservoir to brake cylinder will be opened. Subsequently, the same procedure as described above will take place and move the service main piston system 202 back again to service lap position. The reduction of brake pipe pressure and hence the increase in brake cylinder pressure can be continued until the auxiliary reservoir pressure is equal to the brake cylinder pressure. A further reduction of brake pipe pressure does not affect the level of the brake cylinder pressure during a service application, but moves the main piston system 202 to the service position. The quick service limiting valve 230 assures a predetermined minimum brake cylinder pressure. Should the brake cylinder pressure drop below this value—for example, due to brake cylinder leakage—the quick service limiting valve 230 will open and feed brake pipe pressure via the quick service chamber to brake cylinder.

In the service lap position, the control valve has moved from charging lap and undertaken the following steps. The first step is quick service, where BP is reduced lower than AR to the point that the quick service check valve 214 is opened and the valve moves up into the service zone. Once the valve is in the service zone, the valve fills AR pressure into BC through check 216. The valve continues to fill BC until BP and AR are roughly equal. The limiting valve 230 will run until BC pressure under diaphragm 231 reaches about 8 to 12 pounds per square inch. At this point, the quick service limiting valve 230 will shut off Once the AR and BP are roughly equalized and the filling of BC has been completed, the valve is in service lap.

Figure 3:
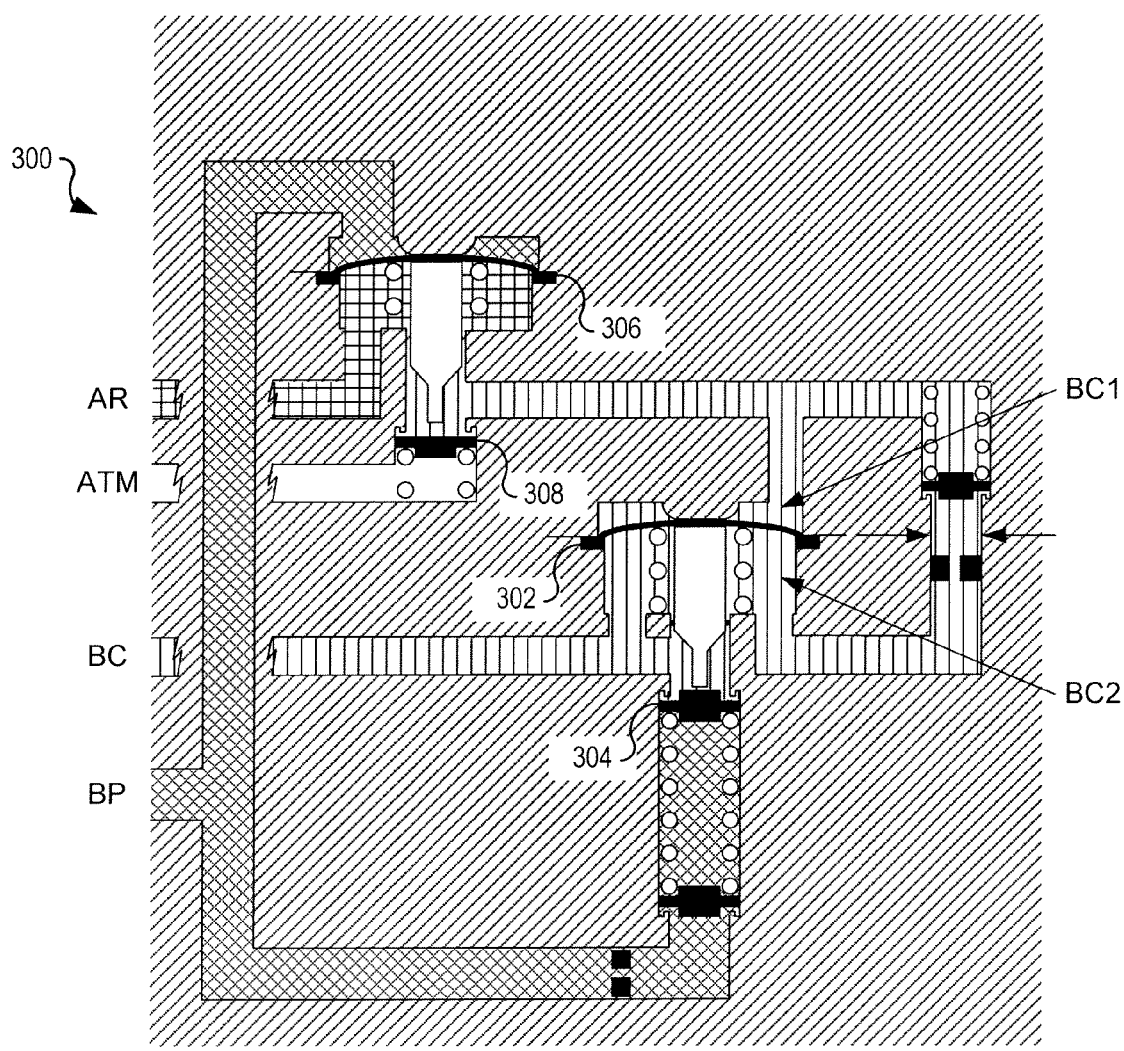
FIG. 3 is a diagrammatic view of a brake cylinder maintaining valve according to one embodiment of the present invention.

Referring now to FIG. 3, there is shown a brake cylinder (BC) maintaining valve 300 according to a first embodiment of the present invention. This poppet valve embodiment is shown in the service lap position. Accordingly, the valve 300 has made a brake application where the valve has charged BC up to its set point. At this point, BC1 is roughly 15 psi lower than BC2. If BC starts to leak, then BC2 pressure will become lower than BC1 and the diaphragm 302 will move down opening check valve 304, allowing BP air to flow into BC which will do so until BC pressure is maintained to roughly the original set pressure. During the release of the valves, there will be a rise in BP pressure, and when BP becomes greater than AR diaphragm 306 will open check valve 308 and exhaust the trapped air putting the valve back into charging lap position.

Figure 4:
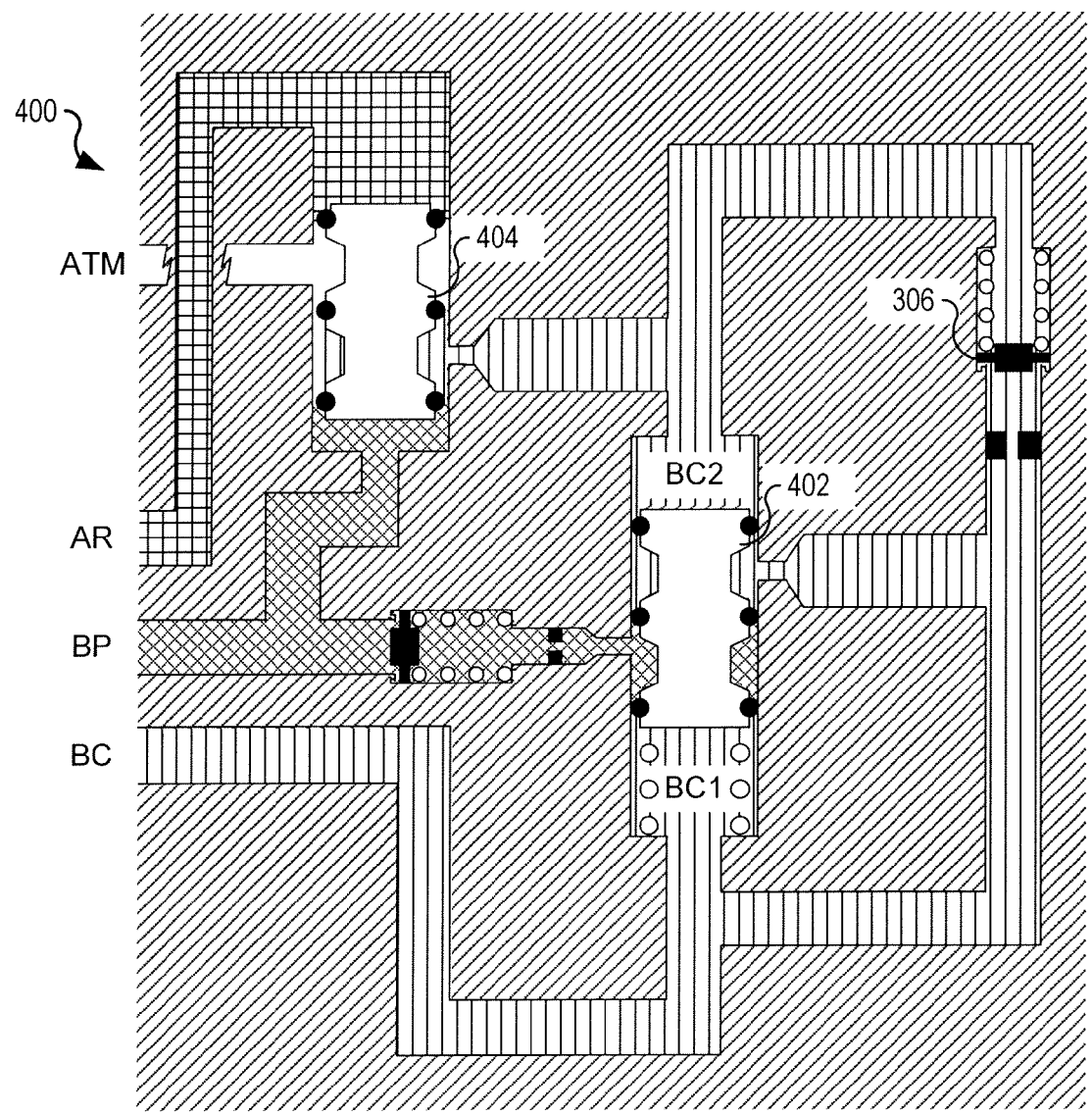
FIG. 4 is a diagrammatic view of a brake cylinder maintaining valve according to another embodiment of the present invention.

The spool design shown in FIG. 4 has the same function as the poppet design shown in FIG. 3, but it has been designed using spool valve technology. This valve 400 is in the state where the control valve has gone into the service lap position where BC2 is roughly 15 psi lower than BC1. If BC starts to leak, then BC1 pressure will become lower than BC2, and the spool valve 402 will move down connecting BP to BC. This will stay connected until BC has been maintained to roughly the original set pressure. During the release of the valve, there will be a rise in BP, and when BP becomes greater than AR, spool valve 404 will move up connecting the trapped BC to atmosphere. This will put the BC maintaining valve 400 back to its initial charging state.

Referring now to FIGS. 5 and 6, the operation of the brake cylinder maintaining valve utilizing a sandwich plate between the service portion of the brake control valve and its release valve will now be described. During charging or release, valve 505 will be open to atmosphere which will exhaust the reference BC pressure on top of diaphragm 502. In the charging lap position (i.e., where BP is about equal to AR) as shown in FIG. 5, exhaust check valve 505 will be open. Once in a service application, BC pressure under diaphragm 502 is substantially equal to the actual brake cylinder (BC) pressure. On top of diaphragm 502, BC is roughly 15 psi lower than the pressure in the brake cylinder (BC). This 15 psi difference is created by the cracking pressure of check valve 503.

If a leakage occurs, the BC pressure under diaphragm 502 will become lower than the pressure on top of the diaphragm 502 causing the diaphragm 502 to open check valve 504 and maintain BC against the leakage in the brake cylinder by supplying BP air through valve 504. It should also be noted that check valve 503 could be removed and check valve 505 could be ported to BC and used as the feed check valve for the reference BC air. In such a manner, when the reference air is exhausted it will be exhausted to the retainer line RET. The brake cylinder maintaining valve may be integrated (see, e.g., FIGS. 9 and 10) into the control valves of either a DB-60 or an ABDX and on either side, either in the emergency portion or in the service portion. It may be preferable if it is on the service portion side, where it can be upstream of the release valve so the lock out feature of the release valve will work.

For example, FIGS. 7 and 8 illustrate its incorporation into an ABDX-type control valve 700. In charging lap, port 701 vents BC air from the top of diaphragm 703. Also, port 708 will not be connected to supply the quick service limiting valve 705. So when the valve 700 is in this position there will be no BC maintaining. In service lap (as shown in FIG. 8), the control valve 700 has moved from charging lap and gone through the following steps.

The first step is quick service where BP is reduced lower than AR to the point that the quick service is opened and the valve moves up into the service zone. Once the valve is in the service zone, the valve fills AR pressure into BC. The valve continues to fill BC until BP and AR are roughly equal. The limiting valve will run until BC pressure under diaphragm 703 reaches 8 to 12 psi.

At this point, the quick service limiting valve 705 will shut off. During this time, BC pressure will open the back flow check valve 706 which has a high enough cracking pressure to not to interfere with the function of the limiting valve. Once the AR and BP are roughly equalized and the filling of BC has been completed the valve is in service lap.

Once in service lap, if the BC leaks off then the BC pressure under the diaphragm 703 will become lower than the original reference pressure which is bottled on top of the diaphragm due to port 701 being closed when the valve is in the service zone. Once the pressure differential is high enough, the diaphragm will push the spool down opening port 704 allowing BP to flow into BC until diaphragm 703 is balanced again. Once the valve moves back to its charging lap position, port 701 opens and the bottled air is released putting the modified limiting valve 705 back into charging lap position. And, the BC pressure is exhausted to atmosphere.

Figure 9:
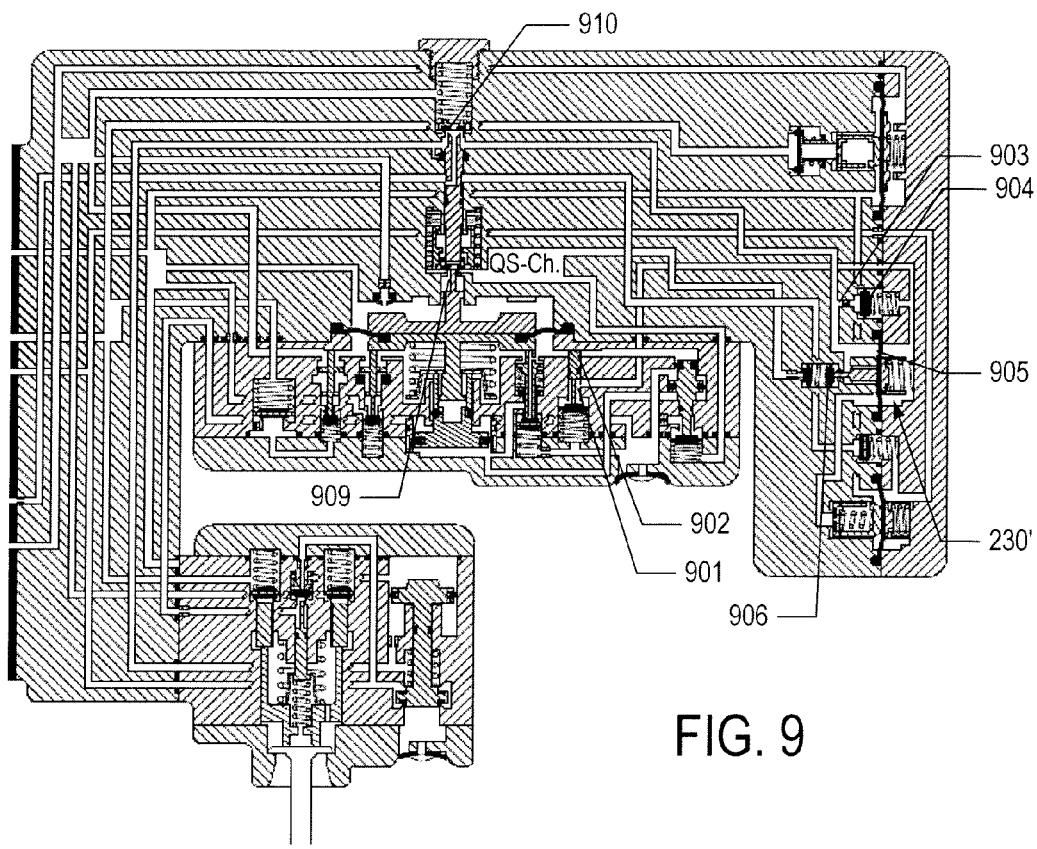
FIG. 9 is a diagrammatic view of a brake cylinder maintaining valve integrated into the control valve in its charging lap position.
Figure 10:
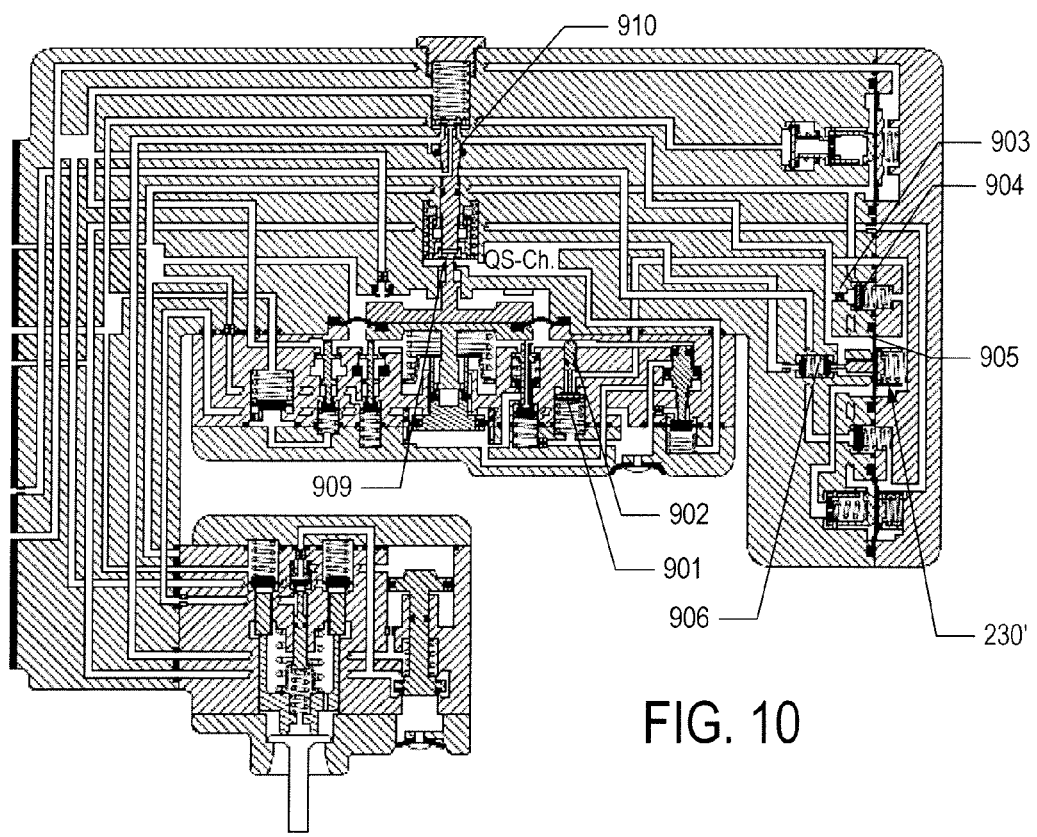
FIG. 10 is a diagrammatic view of a brake cylinder maintaining valve integrated into the control valve in its service lap position.

FIGS. 9 and 10 are diagrammatic views of a brake cylinder maintaining valve integrated into the control valve in its charging lap and service lap positions, respectively. In the charging lap position as shown in FIG. 9, check 901 will be venting BC air from the top of diaphragm 905. Also, there will be no air in the quick service chamber QS Ch. to supply the modified limiting valve 230'. So when the valve is in this position there will be no BC maintaining.

In its service lap position as shown in FIG. 10, the control valve has moved from charging lap and gone through the following steps. The first step is quick service, where BP is reduced lower than AR to the point that the quick service check 909 is opened and the valve moves up into the service zone. Once the valve is in the service zone, the valve fills AR pressure into BC through check 910, and the valve continues to fill BC until BP and AR are roughly equal. The quick service limiting valve 230' will run until BC pressure under diaphragm 905 reaches 8 to 12 psi. At this point, the quick service limiting valve 230' will shut off. During this time, BC pressure will open the back flow check 904, which has a high enough cracking pressure to not interfere with the function of the quick service limiting valve 230'. Once the AR and BP are roughly equalized and the filling of BC has been completed, the valve is in service lap. Once in service lap, if the BC leaks off, then the BC pressure under the diaphragm 905 will become lower than the original reference pressure, which is bottled on top of the diaphragm 905 due to check 901 being closed when the valve is in the service zone. Once the pressure differential is high enough, the diaphragm will push the check 906 open allowing BP to flow into BC until diaphragm 905 is balanced again.

Once the valve moves back to its charging lap position, check 901 is opened and the bottled air is released putting the modified quick service limiting valve 230' back into charging lap position. And the BC pressure is exhausted to atmosphere.

Figure 11:
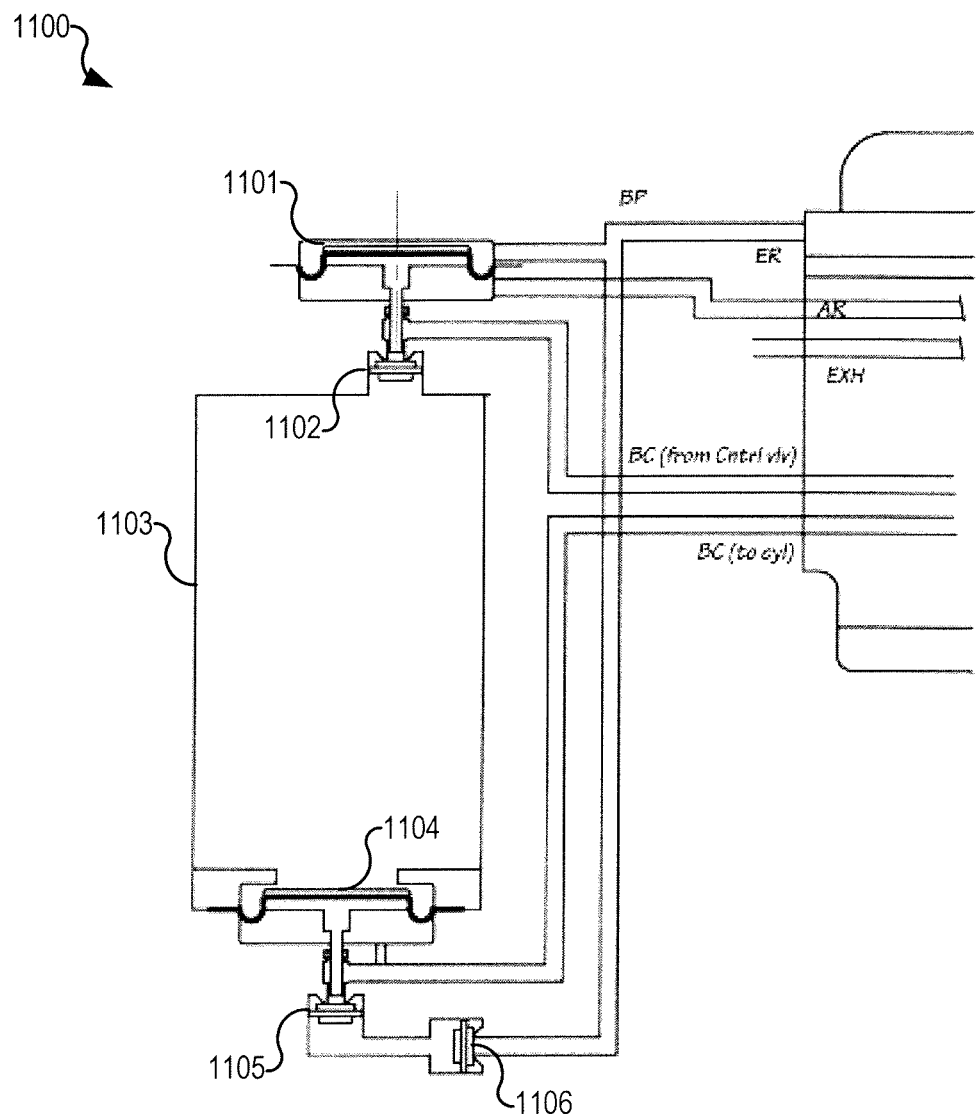
FIG. 11 is a diagrammatic view of a brake cylinder maintaining valve shown as a sandwich plate between the service portion and release valve and in its service lap position.

FIG. 11 shows yet another embodiment of a brake cylinder maintaining valve 1100. According to this embodiment (which is shown in its service lap position), the valve 1100 is in its home position. During a service application, BC pressure will enter volume 1103 through check 1102 which will have a cracking pressure of roughly 15 psi. Once in service lap, if BC leaks, the pressure on top of diaphragm 1104 will be greater than the pressure under the diaphragm causing the diaphragm to open check 1105. This, in turn, will supply BP pressure to the brake cylinder to compensate for the leak therein. Check 1106 will then keep BC from flowing back into BP in the event that BP is lower than BC this could be during an over reduction or during an emergency application. During the release of the valve 1100, BP will be greater than AR, which will cause diaphragm 1101 to move down and open check 1102. This, in turn, will allow the bottled BC air to exhaust out through the retainer line.

Figure 12:
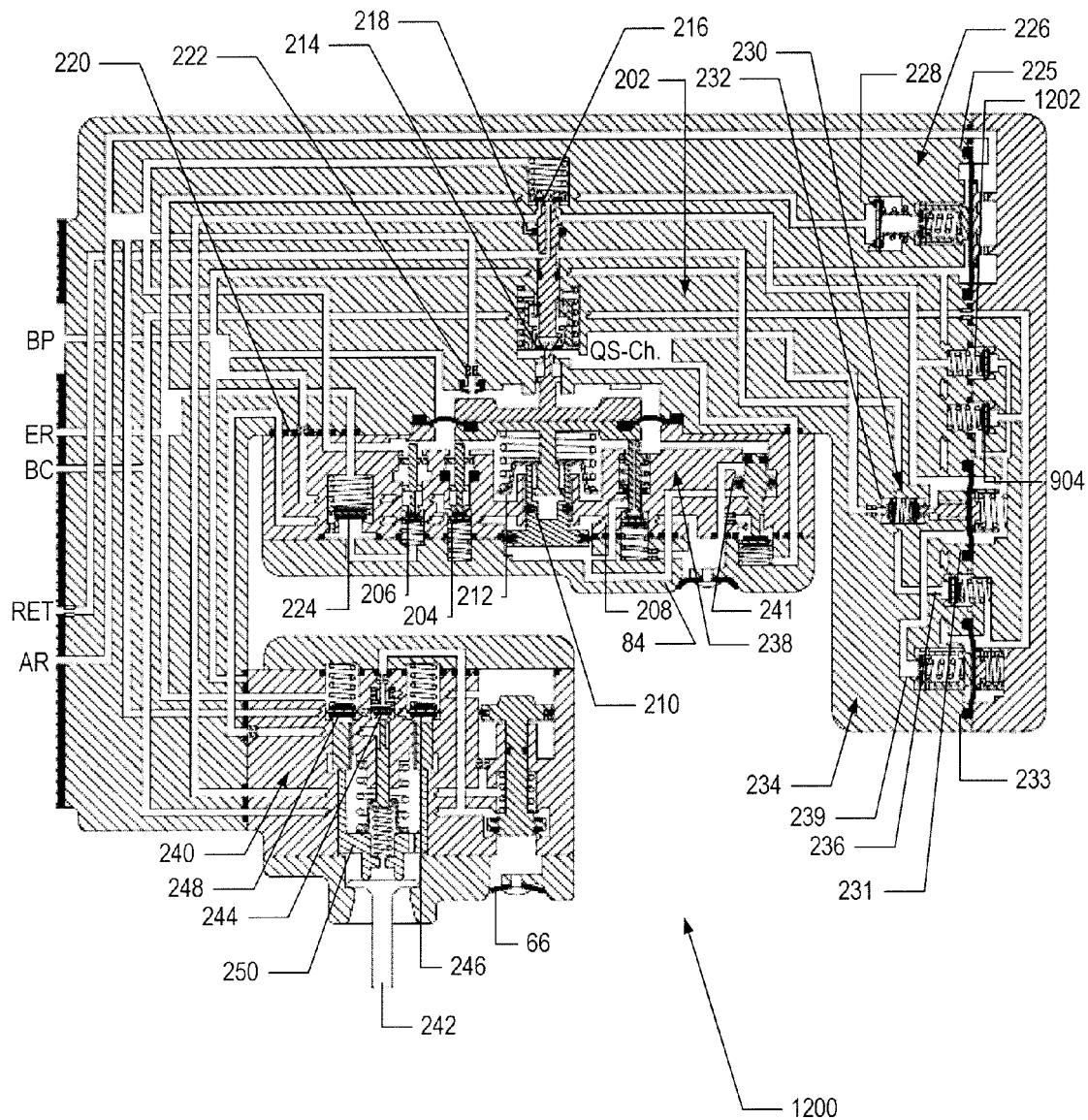
FIG. 12 is a brake cylinder maintaining valve according to still another embodiment of the present invention.

FIG. 12 shows still another embodiment of a brake cylinder maintaining valve 1200. In contrast to the embodiment shown in FIGS. 9 and 10 (where the reference pressure is charged through back flow check 904 from BC1), the embodiment shown in FIG. 12 charges from the same back flow check 904 but from BC2. In regards to exhausting in the embodiment shown in FIGS. 9 and 10, such exhausting takes place through check 901. The exhausting takes place in the embodiment shown in FIG. 12 through an exhaust valve 1202 into BC1.

Although the present brake cylinder maintaining valve has been described and illustrated in detail, it is to be clearly understood that the same is by way of illustration and example only, and is not to be taken by way of limitation. The scope of the present invention is to be limited only by the terms of the appended claims.

What is claimed:

1. A brake cylinder maintaining valve for maintaining brake cylinder pressure in freight car brake equipment, comprising:
    a first valve including a diaphragm with a brake pipe pressure on an upper surface thereof and an auxiliary reservoir pressure on a lower surface thereof;
    a first check valve coupled to said first valve and having auxiliary reserve and atmospheric pressures on opposing surfaces thereof;
    a second valve including a diaphragm with a first brake cylinder pressure on an upper surface thereof and a second brake cylinder pressure on a lower surface thereof;
    a second check valve coupled to said second valve and having the second brake cylinder pressure and the brake pipe pressure on opposing surfaces thereof; and wherein the second check valve provides the brake pipe pressure through a choke to replenish the second brake cylinder pressure if the second brake cylinder pressure is below an original set pressure represented by the first brake cylinder pressure.

2. The brake cylinder maintaining valve according to claim 1, wherein in a service lap position the first brake cylinder pressure is substantially equal to the second brake cylinder pressure.

3. The brake cylinder maintaining valve according to claim 2, wherein said diaphragm of said second valve is adapted to move when the first brake cylinder pressure is less than the second brake cylinder pressure by a predetermined amount, thereby opening said first check valve and allowing the brake pipe pressure to replenish the second brake cylinder pressure to said original set pressure.

4. The brake cylinder maintaining valve according to claim 3, wherein said predetermined amount comprises about 8 to 12 pounds per square inch (PSI).

5. The brake cylinder maintaining valve according to claim 4, wherein said predetermined amount comprises about 8 pounds per square inch (PSI).

6. The brake cylinder maintaining valve according to claim 1, wherein said original set pressure is charged from the second brake pipe pressure.

7. The brake cylinder maintaining valve according to claim 1, wherein said original set pressure is charged through a supply valve.

8. The brake cylinder maintaining valve according to claim 1, wherein said original set pressure is exhausted through an exhaust valve.

9. The brake cylinder maintaining valve according to claim 1, wherein said diaphragm of said first valve is adapted to move when the brake pipe pressure is greater than the auxiliary reserve pressure, thereby opening said first check valve, exhausting the first brake cylinder pressure to atmosphere, and returning the brake cylinder maintaining valve to its charging lap position.

* * * * *